United States Patent Office 3,260,608
Patented July 12, 1966

3,260,608
NON-AQUEOUS GEL-RESISTANT PAINTS
Thom Ian Kyle, Middlesbrough, England, assignor to British Titan Products Company Limited, Durham, England, a company of England
No Drawing. Filed June 15, 1965, Ser. No. 464,234
Claims priority, application Great Britain, Aug. 23, 1960, 29,158/60
10 Claims. (Cl. 106—263)

This application is a continuation-in-part of U.S. Application Serial No. 133,049 filed August 22, 1961, now abandoned.

The present invention relates to non-aqueous gelling-resistant liquid surface coating compositions and to methods for their preparation.

It is known that the viscosity of liquid surface coating compositions containing metal oxide pigments, particularly titanium dioxide pigment, often increases when the paint is stored for prolonged periods. This increase in viscosity particularly in non-aqueous paints is known as "gelling."

It is an object of the present invention to provide non-aqueous liquid surface coating compositions in which this tendency is reduced or eliminated.

It is also an object of the invention to provide methods for the preparation of such compositions.

Accordingly, the present invention comprises a non-aqueous, liquid, gelling-resistant surface coating composition consisting of (1) a titanium dioxide pigment and (2) a paint medium comprising a drying oil and a free polyhydroxy or polyhydric alcohol which is miscible with the paint medium, the polyhydroxy alcohol being selected from the group consisting of straight chain polyalcohols containing from 2 to 6 carbon atoms and condensation polymers thereof which are liquid at room temperature and wherein the weight of the polyalcohol in the composition is in the range 0.25% to 5% of the weight of the titanium dioxide pigment.

The titanium dioxide pigment may be anatase or rutile and may have been prepared, for example, by the sulphate process or by the vapour phase oxidation of a titanium tetrahalide, for example, titanium tetrachloride.

The process of the persent invention is of particular importance where the pigment particles are coated with one or more compounds selected from the group consisting of oxides of the metals aluminum, titanium, zirconium, cerium and silicon since such coated pigments are particularly liable to cause gelling.

Convenient amounts of each of the oxides which may be applied to the pigmentary titanium dioxide particles are in the range 0.5% to 5% and particularly an amount in the range 1% to 3% by weight of titanium dioxide.

In addition to the titanium dioxide pigment, the surface coating composition of the invention contains a paint medium which includes a drying oil (in adition to the polyalcohol).

A drying oil is defined, for the purpose of this specification, as an oil of vegetable, animal or synthetic origin which is capable of forming a tough film on exposure to air (see, for example, "Glossary of Terms Used in the Paint, Varnish and Allied Trades," by Chatfield, Messrs. Scott and Greenwod Limited, London, England).

Examples of drying oils are linsed oil; soya oil; tung oil; safflower oil; tobacco seed oil; dehydrated castor oil; cotton seed oil; China-wood oil; tall oil and oiticica oil.

The drying oil may also be a polymerized oil, for example, stand oil.

The drying oil may be present as such or it may be incorporated into a resin, for example into a natural resin to form a copal varnish (which consists of a vegetable resin which is normally "run" e.g. heated to 300°–350° C. and mixed with a drying oil) or into a synthetic resin to form an oil-modified resin such as oil modified alkyd or phenolic resins. Such modified resins are widely used in the production of non-aqueous surface coating compositions.

The oil modified synthetic resins are usually classed as "long oil" or "short oil" resins depending upon the proportion of drying oil it contains. This may, for example, vary between about 20% and 70% and particularly between about 55% and 60% by weight.

In addition to the resins mentioned above any other resin suitable for inclusion into paint media may also be present in the final coating composition, for example, natural resins such as elemi or wood resins or synthetic resins such as urea- or melamine-formaldehyde resins.

Such resins may or may not be incorporated with the drying oil before adding to the paint medium, as desired.

The polyalcohol in the paint media of the present invention must be a free polyalcohol, i.e. it is not effective if added when in chemical combination with any other compound, for example when chemically combined in an alkyd resin. It must also be liquid at room temperature and miscible (at least in the proportions required in this specification) with the coating composition, otherwise it will not be effective in elminatng or reducng gelling.

In addition to the foregoing properties the polyalcohol must also comprise a molecule having a straight carbon chain having at least two free hydroxy groups and containing from 2 to 6 carbon atoms or it must be a condensation polymer thereof, i.e. in which the monomer residues are joined by ether linkages to form the polymer (which also contains at least two free hydroxy groups).

Where the polyalcohol is a polymer its molecular weight must be such that it is liquid at room temperature and miscible with the coating composition, in the proportions required by this invention.

It is preferred that the polyalcohol should have terminal hydroxy groups separated by at least two carbon atoms.

Generally, polyalcohols or polyhydric alcohols having a low molecular weight, particularly dihydric alcohols containing from 2 to 4 carbon atoms such as ethylene and diethylene glycol, are preferred since these have been found to be most effective weight for weight. Dihydric alcohols containing six carbon atoms particularly hexane-1:6-diol and triethylene glycol are also very effective in the present process.

The amount of polyalcohol incorporated into the coating composition will be in the range 0.25% to 5% and preferably in the range 0.75% to 1.25% (by weight of the titanium dioxide pigment).

In addition to the titanium dioxide pigment, drying oil, resin and polyalcohol the surface coating or paint composition may contain a number of ether materials, for example, fillers, driers and/or organic diluents.

As fillers, for example, there may be used barium sulphate, calcium sulphate, china clay or silica etc., suitably in an amount in the range 2% to 60% (by weight of the dry paint film).

Where driers are added these generally consist of known cobalt, manganese and/or lead compounds, such as the naphthenates, suitable for this purpose.

Normally, there will be present in the coating composition a variable amount of organic diluent added initially to provide liquid surface coating compositions of the correct consistency. The most common of these diluents is turpentine or white spirit.

The aforementioned fillers, driers and diluents are by way of example only since it is to be understood that conventionally employed fillers, driers, and diluents can be used in the paint compositions of the present invention.

The present invention is applicable only to non-aqueous liquid coating compositions since gelling in liquid aqueous compositions is believed to be due to a different mechanism from that in non-aqueous paints which is not as markedly affected by the presence of a free polyalcohol according to the present invention.

By the term "non-aqueous coating compositions" is meant one in which no substantial amount of water is introduced (for example) in excess of that which may be present in the constitutents of the composition as an impurity), as a solvent or suspending medium or continuous phase.

It is believed, although I do not wish to be bound by the theory, that the reason for gelling in non-aqueous paints containing a drying oil and titanium dioxide pigment is due to preferential adsorption by the titanium dioxide particles of lower molecular weight components of the drying oil in the absence of a polyalcohol thereby causing an increase in the viscosity of the paint (i.e. gelling) medium.

In the presence of a polyalcohol of the present invention it is thought that the polyalcohol is preferentially adsorbed on to the titanium dioxide particles, thus either preventing the adsorption of lower molecular weight components or, where such adsorption has already begun to take place, by replacing these on the titanium dioxide particles and liberating the lower molecular weight components of the drying oil.

This view is supported by the fact that it is frequently possible to reverse gelling in non-aqueous paints containing a drying oil at least in the early stages, by the addition to the coating composition of a polyalcohol according to the present invention.

The following examples illustrate the invention.

*Example 1*

A liquid non-aqueous surface coating composition was made to the following formulation:

|  | G. |
| --- | --- |
| Rutile titanium dioxide (coated with 2% alumina) | 40 |
| Copal varnish (containing driers) 65% solids (containing 50% drying oil) | 61 |
| White spirit | 19.0 |
| Diethylene glycol | 0.4 |

The whole charge was loaded into ⅜ pint glass jars containing 130 g. of 8 mm. glass balls (Ballotini) and sealed therein. This charge was milled for 16 hours by trundling (or rotating) the jar. The composition was separated from the balls and its viscosity determined when fresh and after appropriate periods of storage in sealed glass jars at 75° F.

| | Viscosity (seconds required to empty small Ford Cup No. 4) |
| --- | --- |
| Fresh composition | 34 |
| Composition after 4 days storage | 33 |
| Composition after 2 months storage | 58 |

As a contrast to Example 1, a composition made to the following formulation:

|  | G. |
| --- | --- |
| Anatase titanium dioxide (coated with 0.5% silica and 1½% alumina) | 40 |
| Copal varnish (containing driers) 65% solids (containing 50% drying oil) | 61 |
| White spirit | 19.4 | and subsequently milled and stored in exactly the same manner as the first composition, gave the following results:

| | Viscosity (seconds) |
| --- | --- |
| Fresh composition | 39 |
| Composition after 4 days storage | 85 |
| Composition after 2 months storage | Too thick to flow |

*Example 2*

A composition was made to the following formulation:

|  | G. |
| --- | --- |
| Rutile titanium dioxide pigment (coated with 0.5% silica, 1% alumina and 1% titanium dioxide) | 40 |
| Copal varnish (containing driers) 65% solids (containing 50% drying oil) | 61 |
| White spirit | 19.0 |
| Ethylene glycol | 0.4 |

This composition again was milled and stored in exactly the same manner as the paint in Example 1.

The viscosity figures obtained with this paint were:

| | Viscosity (seconds) |
| --- | --- |
| Fresh composition | 35 |
| Composition after 4 days storage | 35 |
| Composition after 2 months storage | 73 |

*Example 3*

The process described in Example 1 was repeated with the exception that the alumina-coated rutile pigment and diethylene glycol were intimately mixed before the addition of the copal varnish and white spirit.

The mixture was then treated and tested as described in Example 1. The results obtained during the tests were similar to those given in Example 1.

*Example 4*

The compositions described in Example 1 were prepared using 0.4 g. of the following compounds, in place of diethylene glycol.

Polyethylene glycol (this was a commercially obtainable polymerized ethylene glycol which was liquid at room temperature and completely miscible with the medium in the concentration)
Pentane-1,5-diol
Hexane-1,6-diol The results, after testing as described in Example 1, were "excellent" in the case of the compositions containing polyethylene glycol and pentane-1,5-diol and "good" for compositions containing hexane-1,6-diol.

*Example 5*

A surface coating composition was prepared according to the following formula:

|  |  |
| --- | --- |
| Rutile titanium dioxide pigment (coated with 0.7% silica and 2% alumina), g. | 100 |
| Soya alkyd resin (containing 70% soya oil), g. | 125 |
| White spirit, g. | 100 |
| Driers (added as naphthenates): | |
| Percent lead | 0.5 |
| Percent cobalt | 0.5 |
| Ethylene glycol, g. | 5 |

A similar composition was prepared without ethylene glycol.

After milling, the viscosity of the compositions was determined by obtaining the time required for the composition to run from a small Ford cup and samples were then stored in clean sealed jars and the viscosity was determined after a period of storage.

The viscosity of the freshly milled composition containing ethylene glycol was such that it ran from the cup in about 35 seconds and after 4 months storage the time taken to run from the cup was 40 seconds.

In the case of the composition not containing ethylene glycol the viscosity of the freshly milled material was such that it took 39 seconds to empty the cup whereas after 4 months storage it took 95 seconds.

Example 6

A surface coating composition was made to the following formula:

| | |
|---|---|
| Rutile titanium dioxide pigment, g. | 100 |
| Linseed oil, g. | 125 |
| White spirit, g. | 100 |
| Driers (added as naphthenates): | |
|     Percent lead | 0.5 |
|     Percent cobalt | 0.5 |
| Ethylene glycol, g. | 0.35 |

A similar composition was prepared without ethylene glycol.

After milling, the viscosity of the compositions was determined by means of the method given in Examples 1 to 4 and samples were stored in clean sealed jars.

The viscosity of the samples was again determined after 4 months storage and the following results obtained.

The viscosity of both compositions immediately after milling was such that a small Ford cup required about 40 seconds to empty.

After storage for 4 months the viscosity of the composition containing ethylene glycol had increased slightly so that it required about 70 seconds to empty the same Ford cup.

The composition not containing ethylene glycol had increased in viscosity over a similar period to such an extent that it was too thick to flow from the cup in a reasonable period of time.

It will be understood that modifications and variations may be effected without departing from the scope of the novel concepts of the present invention.

I claim:

1. A non-aqueous, liquid, gelling resistant surface coating composition consisting essentially of (1) a titanium dioxide pigment and (2) a paint medium comprising (a) a drying oil and (b) a miscible, free polyhydroxy alcohol which is liquid at room temperature, the polyhydroxy alcohol being selected from the group consisting of straight chain polyalcohols containing 2–6 carbon atoms and condensation polymers thereof and wherein the weight of the polyalcohol in the coating composition is from about .25% to 5% of the weight of the titanium dioxide pigment.

2. A non-aqueous, liquid, gelling resistant surface coating composition consisting essentially of (1) a titanium dioxide pigment and (2) a paint medium comprising (a) a drying oil and (b) a miscible free dihydric alcohol which is liquid at room temperature, the dihydric alcohol being selected from the group consisting of straight chain dihydric alcohols containing from 2 to 6 carbon atoms and condensation polymers thereof and wherein the weight of the dihydric alcohol in the coating composition is from about .25% to 5% of the weight of the titanium dioxide pigment.

3. A non-aqueous, liquid, gelling resistant surface coating composition consisting essentially of (1) a titanium dioxide pigment and (2) a paint medium comprising (a) a drying oil and (b) a miscible free dihydric alcohol which is liquid at room temperature, the dihydric alcohol being selected from the group consisting of straight chain dihydric alcohols containing from 2 to 6 carbon atoms and condensation polymers thereof and wherein the weight of the dihydric alcohol in the coating composition is from about .75% to 1.25% of the weight of the titanium dioxide pigment.

4. A non-aqueous, liquid, gelling resistant surface coating composition consisting essentially of (1) a titanium dioxide pigment and (2) a paint medium comprising (a) a drying oil and (b) a miscible free dihydric alcohol which is liquid at room temperature, the dihydric alcohol being selected from the group consisting of straight chain dihydric alcohols containing from 2 to 4 carbon atoms and condensation polymers thereof and wherein the weight of the dihydric alcohol in the coating composition is from about .75% to 1.25% of the weight of the titanium dioxide pigment.

5. The composition of claim 1 in which the drying oil also contains a resin selected from the group consisting of (a) synthetic resins such as the alkyd, phenolic and the urea type resins and (b) the natural resins such as the copals, elemi and wood resins.

6. The composition of claim 1 which contains an additional constituent selected from the group consisting of fillers, driers, and diluents conventionally employed in paint compositions.

7. The composition of claim 2 in which the drying oil also contains a resin selected from the group consisting of (a) synthetic resins such as the alkyd, phenolic and the urea type resins and (b) the natural resins such as the copals, elemi and wood resins.

8. The composition of claim 2 which contains an additional constituent selected from the group consisting of fillers, driers, and diluents conventionally employed in paint compositions.

9. The composition of claim 4 in which the drying oil also contains a resin selected from the group consisting of (a) synthetic resins such as the alkyd, phenolic and the urea type resins and (b) the natural resins such as the copals, elemi and wood resins.

10. The composition of claim 4 which contains an additional constituent selected from the group consisting of fillers, driers, and diluents conventionally employed in paint compositions.

References Cited by the Examiner

UNITED STATES PATENTS

| | | | |
|---|---|---|---|
| 2,991,183 | 7/1961 | Lederer et al. | 106—252 XR |
| 3,001,961 | 9/1961 | Armitage et al. | 106—252 XR |
| 3,018,186 | 1/1962 | Jenkins | 106—253 |
| 3,050,406 | 8/1962 | Karlson | 106—253 XR |
| 3,065,093 | 11/1962 | Berstein | 106—253 |
| 3,127,280 | 3/1964 | Whatley | 106—253 XR |

ALEXANDER H. BRODMERKEL, *Primary Examiner.*

J. B. EVANS, *Assistant Examiner.*